(12) United States Patent
Kaufmann et al.

(10) Patent No.: US 12,241,515 B2
(45) Date of Patent: Mar. 4, 2025

(54) TORQUE LIMITER WITH A ROTATIONAL AXIS FOR A DRIVE TRAIN

(71) Applicant: Schaeffler Technologies AG & Co. KG, Herzogenaurach (DE)

(72) Inventors: Romain Kaufmann, Gundershoffen (FR); Alain Rusch, Gambsheim (FR); Michael Kessler, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 71 days.

(21) Appl. No.: 17/766,267

(22) PCT Filed: Oct. 15, 2020

(86) PCT No.: PCT/DE2020/100893
§ 371 (c)(1),
(2) Date: Apr. 4, 2022

(87) PCT Pub. No.: WO2021/083453
PCT Pub. Date: May 6, 2021

(65) Prior Publication Data
US 2024/0052894 A1 Feb. 15, 2024

(30) Foreign Application Priority Data
Oct. 29, 2019 (DE) .................. 10 2019 129 145.3

(51) Int. Cl.
*F16D 7/02* (2006.01)
*F16F 15/129* (2006.01)
*F16D 13/64* (2006.01)

(52) U.S. Cl.
CPC .......... *F16D 7/025* (2013.01); *F16F 15/1292* (2013.01); *F16D 2013/642* (2013.01)

(58) Field of Classification Search
CPC . F16D 7/025; F16D 2013/642; F16F 15/1292
(Continued)

(56) References Cited

U.S. PATENT DOCUMENTS 3,323,328 A * 6/1967 Montgomery .......... F16D 47/02
464/46
6,200,221 B1 * 3/2001 Maejima ................. F16D 7/025
464/45
(Continued)

FOREIGN PATENT DOCUMENTS

| CN | 109416083 A | 3/2019 |
| CN | 109790877 A | 5/2019 |

(Continued)

*Primary Examiner* — Greg Binda

(57) ABSTRACT

A torque limiter for a drive train includes a rotational axis, a first cover disc and a second cover disc, a central disc arranged axially between the cover discs, a first friction lining and a second friction lining, a radially outer connector and a radially inner connector, and a spring element. The first friction lining is for frictionally locking torque transmission between the first cover disc and the central disc, and the second friction lining is for frictionally locking torque transmission between the second cover disc and the central disc. The radially outer connector is permanently connected to the cover discs in a torque-transmitting manner, and the radially inner connector is permanently connected to the central disc in a torque-transmitting manner. The spring element is arranged between the central disc and the first friction lining or the second friction lining.

6 Claims, 5 Drawing Sheets

(58) Field of Classification Search
USPC .................................................... 464/45, 46
See application file for complete search history.

(56) References Cited

U.S. PATENT DOCUMENTS

| | | | | |
|---|---|---|---|---|
| 7,766,752 B2 * | 8/2010 | Saeki | ...................... | F16D 7/025 |
| | | | | 464/46 |
| 10,948,024 B1 * | 3/2021 | Uehara | ............... | F16F 15/1297 |

FOREIGN PATENT DOCUMENTS

| | | |
|---|---|---|
| DE | 901138 C | 1/1954 |
| DE | 102019119826 A1 | 1/2021 |
| EP | 1176339 A2 | 1/2002 |
| GB | 1178756 A | 1/1970 |
| JP | 2008303995 A | 12/2008 |
| JP | 2011012705 A | 1/2011 |
| KR | 20200050974 A | 5/2020 |
| WO | 2018109129 A1 | 6/2018 |

\* cited by examiner

A-A

TORQUE LIMITER WITH A ROTATIONAL AXIS FOR A DRIVE TRAIN

CROSS-REFERENCE TO RELATED APPLICATIONS

This application is the United States National Phase of PCT Appln. No. PCT/DE2020/100893 filed Oct. 15, 2020, which claims priority to German Application No. DE102019129145.3 filed Oct. 29, 2019, the entire disclosures of which are incorporated by reference herein.

TECHNICAL FIELD

The present disclosure relates to a torque limiter with a rotational axis for a drive train, a drive train with such a torque limiter, and a motor vehicle with such a drive train.

BACKGROUND

For example, a torque limiter is known from EP 1 176 339 A1, which includes a friction plate located between two friction linings. The disc spring exerts a force of up to several thousand Newtons. The disc spring and the corresponding force are selected as a function of the torque limit, which, if exceeded, generates slip between the friction linings and the friction plate and thus limits the torque.

If geometrical errors are present, for example if the friction linings, friction plate and/or disc spring are not fully symmetrical, this results in an uneven contact force in the circumferential direction, which leads to problems in defining the torque limit and to uneven wear of the torque limiter.

A device for absorbing torque fluctuations is known from JP 2008 303 995 A, in which the pressure plates and/or the friction plates are set at an angle to solve the aforementioned problem. If high pressures and geometry errors occur simultaneously, uneven pressure distribution may still occur. This is disadvantageous for the constancy of the coefficient of friction and wear.

SUMMARY

The disclosure relates to a torque limiter with a rotational axis for a drive train, having at least the following components:
two cover discs;
a central disc which is arranged axially between the cover discs;
two friction linings which are arranged axially between the central disc and a respective cover disc for the frictionally locking transmission of a torque between the central disc and the respective cover disc;
a radially outer connector which is connected permanently in a torque-transmitting manner to the cover discs; and
a radially inner connector which is connected permanently in a torque-transmitting manner to the central disc.

A spring element is arranged between the central disc and a respective friction lining.

In the following, if the axial direction, radial direction or the circumferential direction and corresponding terms are used without explicitly indicating otherwise, reference is made to the mentioned rotational axis. Unless explicitly stated otherwise, ordinal numbers used in the previous and subsequent descriptions are used only for the purposes of clear distinction and do not indicate the order or ranking of the designated components. An ordinal number greater than one does not necessarily mean that another such component must be present.

The torque limiter includes two cover discs and a central disc as (indirectly) frictionally locking components that transmit torque. A friction lining is provided between one of the cover discs and the central disc in each case, and such a friction lining forms a defined friction value with its friction partner. The friction lining is in direct or indirect frictional connection with the associated cover disc or with the central disc, and the contact force between the friction lining and the respective friction partner is set in a structural manner, i.e., by means of the distance between the cover discs. In one embodiment, a plurality of such friction pairs are provided, and two cover discs each bracket one central disc. For example, a cover disc with two adjacent friction pairs is set up to simultaneously maintain a contact force for both friction pairs.

The cover discs are permanently connected in a torque-transmitting manner to a radially outer connector, for example by means of a flywheel mass. The radially outer connector can be permanently connected in a torque-transmitting manner to a shaft, for example a rotor shaft of an electric machine. The central disc is permanently connected in a torque-transmitting manner to a radially inner connector, for example by means of an absorber element. The radially inner connector can be permanently connected in a torque-transmitting manner to a shaft, for example a transmission input shaft of a transmission gearbox and/or manual transmission.

It is now proposed here that a spring element is arranged between the central disc and a respective friction lining. The spring element is designed to equalize the surface pressure for the frictionally locking transmission of a torque. For example, the spring element is formed in the manner of a corrugated spring, so that with a small axial expansion of the spring element at a point with a geometrical defect, the friction lining is loaded with approximately the same contact force as in the remaining region of the friction lining. This means that the friction lining is permanently evenly loaded during operation. Provided there is no geometric error, the spring element may be loaded to block and/or may occupy only negligibly more axial installation space in operation than the thickness of the sheet material used for the spring element.

It is further proposed in an example embodiment of the torque limiter that a disc spring is arranged axially between one of the cover discs and the associated friction lining.

In this embodiment, a disc spring is provided which generates the desired contact force alone or in cooperation with the spring element by setting a predetermined or adjusted distance between the cover discs. Thus, an axial contact force for creating the frictional connection between one of the friction linings and the respective friction partner, for example the central disc or the associated cover disc, is generated by means of the disc spring, e.g., by means of a single disc spring for both friction linings. In one embodiment, a support disc is arranged between the disc spring and at least one of the friction linings, so that the contact force is transmitted from the disc spring to the friction lining(s) only indirectly, i.e., without frictional contact.

It is further proposed in an example embodiment of the torque limiter that the spring element is axially preloaded for generating an axial contact force between an associated friction lining and the associated cover disc by means of the two cover discs.

Here it is proposed that the function of equalizing the friction force transmission and generating the desired contact force are combined in the spring element. The two cover discs form a force clamp and thus the spring element is axially preloaded. Thus, an axial contact force is generated to create the frictional connection between the friction linings and the respective cover disc by means of the, e.g., single, spring element. In this embodiment, provided there is no geometric error, the spring element may be loaded to block and/or may occupy only negligibly more axial installation space in operation than the thickness of the sheet material used for the spring element. The greater thickness of the spring element's sheet material (assuming the same choice of material) is more than compensated for by the absence of a disc spring. The required axial installation space is thus reduced compared to previously known embodiments of a torque limiter.

It is further proposed in an example embodiment of the torque limiter that one of the friction linings is connected in a force-fitting and/or form-fitting as well as torque-transmitting manner to the associated cover disc or the central disc, or is fixed rotationally in a purely frictionally locking manner.

In one embodiment, the friction linings are fixed directly or indirectly to the central disc, for example by means of rivets. In an alternative embodiment, the friction linings are fixed directly or indirectly to the cover discs, for example by means of gluing.

In another embodiment, the friction linings are not fixed to either the cover discs or the central disc, but are connected on both sides in a purely frictionally locking torque-transmitting manner.

It is further proposed in an example embodiment of the torque limiter that at least one support disc is provided, which is arranged between one of the friction linings and the central disc or one of the cover discs, and the support disc may be arranged between one of the friction linings and the spring element.

A support disc enables the friction lining in question to rest flat against the friction partner, in this case formed by the support disc, instead of the friction lining in question resting directly against the (for example corrugated) central disc or the cover disc in question or a disc spring. For example, the support disc can be used to compensate for an angular error relative to the rotational axis.

By using a support disc between the spring element and the friction lining, generating a predetermined friction value and generating a uniform distribution of the frictionally locking (contact) force introduction and/or generating the contact force are separated from each other. This means that a material can be used for each of the objects according to the properties required in each case (on the one hand wear resistance for a slippage event and on the other good spring stiffness with low settlement properties).

It is further proposed in an example embodiment of the torque limiter that the spring element is formed by one of the support discs.

By using the support disc (described above) as a spring element between the friction lining and the central disc or one of the cover discs, a uniform distribution of the frictionally locking (contact) force introduction and/or generating the desired contact force and providing a torque-transmitting connection to the radially outer connector or to the radially inner connector may be separated. This means that a material can be used for each of the objects according to the properties required in each case (on the one hand, good spring stiffness with low settling properties, among other things, and on the other hand, high torque stiffness).

It is further proposed in an example embodiment of the torque limiter that the spring element is integrated into the central disc.

As the spring element is integrated into the central disc, only a small axial installation space is required. In an example embodiment, no support disc is provided and the central disc is in direct contact with the friction linings. Alternatively or additionally, no disc spring is provided, but the spring element is the only element for generating a (defined) contact force. At least one of the friction linings, e.g., both friction linings, may be in direct frictionally locking contact with the cover disc in question.

It is further proposed in an example embodiment of the torque limiter that the central disc, e.g., the spring element according to an embodiment as described above, includes:
a single-piece ring, and an outer ring portion may be segmented in radial overlap with the friction linings in the direction of rotation and/or may be directly connected to a torsional vibration damper,
multiple separate radially outer segments spaced apart from one another in radial overlap with the friction linings in the direction of rotation; and
multiple separate radially inner segments spaced apart from one another in the direction of rotation and connected directly to the torsional vibration damper.

In this embodiment of the central disc, including the spring element, for example, a single-piece or multi-piece design is proposed. A single-piece design allows a small number of separately mounted components of a torque limiter. A multi-piece design allows flexibility in the assembly sequence, separation of the individual parts according to their function (cf. above note on materials) and/or a reduction in costs due to more favorable materials, manufacturing processes and/or compliance with manufacturing tolerances.

For example, a single-piece ring can be made from a sheet material, e.g., a spring steel, by stamping and forming it into a suitable shape. An outer ring portion may be formed which is set up for direct axial force-transmitting, e.g., also frictionally locking, contact with the friction linings. The outer ring portion may be segmented in the direction of rotation (about the rotational axis) so that separate lobes or tongues are formed, and these segments of the outer ring portion may each be connected by means of bridge portions which are narrower in the direction of rotation to a ring portion lying radially further inwards, for example to an inner ring portion. This means, for example, that the stiffness of the segments of the outer ring portion is only slightly influenced by the stiffness of the radially further inner ring portion, and thus the radially further inner ring portion is also only slightly influenced by deformation of the segments of the outer ring portion.

In an embodiment with several separate radially outer segments, these correspond in function to the outer ring portion mentioned above. For example, a connection section to a radially further inward ring portion, for example with the aforementioned inner ring portion, is designed to be comparable to one of the aforementioned lobes or tongues or a subsection thereof. In an embodiment with several separate radially inner segments, these correspond in function to the inner ring portion mentioned above. For example, a connection section to a ring portion located radially further out, for example with the outer ring portion mentioned above, is designed to be comparable to one of the aforementioned lobes or tongues or a partial section thereof. In one embodiment, the radially outer and radially inner segments are combined, for example directly connected to one another.

According to a further aspect, a drive train is proposed, having at least one drive engine having a machine shaft, at least one consumer and a torque limiter according to an embodiment as described above. The machine shaft is connected in a predeterminedly limited torque-transmitting manner to the at least one consumer for torque transmission by means of the torque limiter.

The drive train is designed to transmit a torque provided by a drive engine, for example an internal combustion engine or an electric machine, and delivered via its output shaft for at least one consumer. An exemplary consumer in the application in a motor vehicle is at least one drive wheel for the propulsion of the motor vehicle. In one embodiment, a plurality of drive engines are provided, for example, in a hybrid drive train, an internal combustion engine and at least one electric machine, for example, a motor-generator. By using a torque limiter in the drive train, the drive engine is protected from damage due to torque peaks.

According to a further aspect, a motor vehicle is proposed, having at least one drive wheel which can be driven by means of a drive train according to an embodiment as described above.

Most motor vehicles today have a front-wheel drive and sometimes arrange the drive engine, for example an internal combustion engine and/or an electric machine, in front of the driver's cab and transversely to the main direction of travel. The radial installation space is small in such an arrangement and it is therefore advantageous to use a drive train with components of small size. The use of a drive train in motorized two-wheeled vehicles is similar, for which an ever-increasing performance is required compared with the previously known two-wheeled vehicles with the same installation space. With the hybridization of the drive trains, this problem is also exacerbated for rear axle arrangements, and also here both in the longitudinal arrangement and in the transverse arrangement of the drive machines.

In the motor vehicle proposed here with the drive train described above, the axial installation space required is reduced as a result of the integration of the function of providing a contact force or a desired spring characteristic and/or the equalization of the contact force in the central disc and/or in a support disc. At the same time, the number of parts and thus the effort involved in assembly can be reduced.

Passenger cars are assigned to a vehicle category according to, for example, size, price, weight, and performance, and this definition is subject to constant change based on the needs of the market. In the US market, vehicles in the small car and microcar categories are assigned to the subcompact car category according to European classification, while in the British market they correspond to the super-mini car and city car categories respectively. Examples of the microcar category are the Volkswagen up! or Renault Twingo. Examples of the small car category are the Alfa Romeo MiTo, Volkswagen Polo, Ford Ka+, or Renault Clio. Well-known full hybrids in the small car category are the BMW i3 or Toyota Yaris Hybrid.

BRIEF DESCRIPTION OF THE DRAWINGS

The above disclosure is explained in detail below based on the relevant technical background with reference to the associated drawings, which show example embodiments. The disclosure is in no way restricted by the purely schematic drawings, and it should be noted that the drawings are not dimensionally accurate and are not suitable for defining proportions. In the figures.

DETAILED DESCRIPTION

Figure 1:
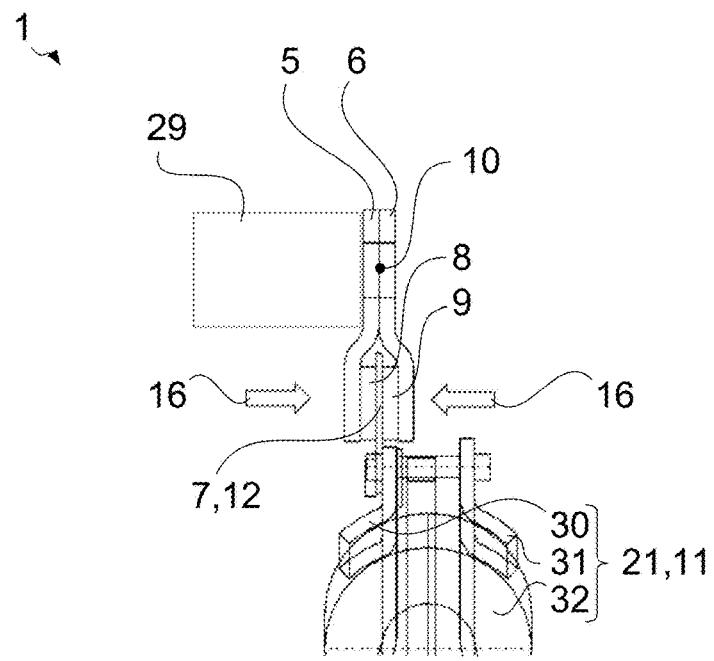
FIG. 1 shows a sectional view of a torque limiter with a central disc with integrated spring element.

In FIG. 1 to FIG. 5, a torque limiter 1 is shown in a schematic sectional view. The torque limiter 1 has a front cover disc 5 (as shown on the left) and a rear cover disc 6 (as shown on the right of the front cover disc 5). The cover discs 5, 6 are connected in a torque-transmitting manner to a radially outer connector 10, for example with a machine connection, here by means of a flywheel 29. On the axially inward-facing inner side of the respective cover disc 5, 6, i.e., the surfaces of the two cover discs 5, 6 facing one another, are each in contact with a friction lining 8, 9, namely the front cover disc 5 with the front friction lining 8 and the rear cover disc 6 with the rear friction lining 9. A central disc 7 is arranged between the two friction linings 8, 9 and the friction linings 8, 9 are in torque-transmitting contact with the central disc 7. The central disc 7 is connected on the radially inner side to a radially inner connector 11 (formed here by or with a torsional vibration damper 21, for example a hub with internal teeth), here (optionally) directly to a front side plate 30 and indirectly to a rear side plate 31 of a torsional vibration damper 21. A damper spring 32 of the torsional vibration damper 21 is further shown in part.

In the shown embodiment of the torque limiter 1 in FIG. 1, the central disc 7 has an integrated spring element 12. By means of an axial contact force 16, a frictional connection is created between the friction linings 8, 9 and the respective cover disc 5, 6. The contact force 16 is generated during assembly of the torque limiter 1 by positioning the cover discs 5, 6 accordingly. The central disc 7 is tensioned by the integrated spring element 12.

In FIG. 2 to FIG. 5, embodiments of the torque limiter 1 with a similar structure are shown. The torque limiters 1 shown there differ from the embodiment according to FIG. 1 with regard to the spring element, the connection of the friction linings 8, 9 and/or in that the support discs are still provided (cf. corresponding figure).

Figure 2:
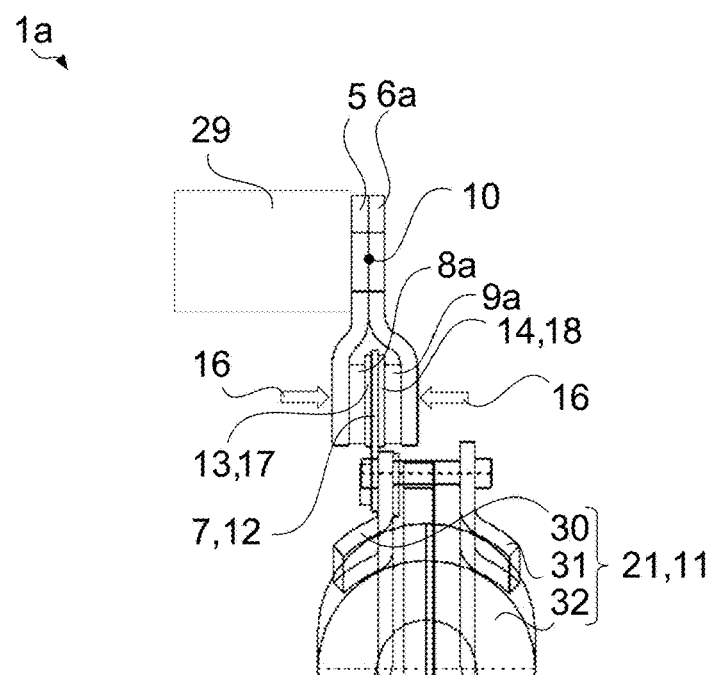
FIG. 2 shows a sectional view of a torque limiter with a central disc and support discs.

FIG. 2 shows a torque limiter 1*a*, similar to torque limiter 1 of FIG. 1 with two additional support discs 17, 18. A front support disc 17 (as shown on the left) is arranged between the front friction lining 8*a* and the central disc 7, and a rear support disc 18 (as shown on the right) is arranged between the central disc 7 and the rear friction lining 9*a*. The support discs 17, 18 improve the contact pressure distribution and/or protect the integrated spring element 12*a*. In one embodiment, the spring element 12*a* is integrated into the central disc 7. In an alternative or additional embodiment, the front support disc 17 includes or forms a front spring element 13 and/or the rear support disc 18 includes or forms a rear spring element 14. In this case, such a support disc 17, 18 is corrugated, for example.

Figure 3:
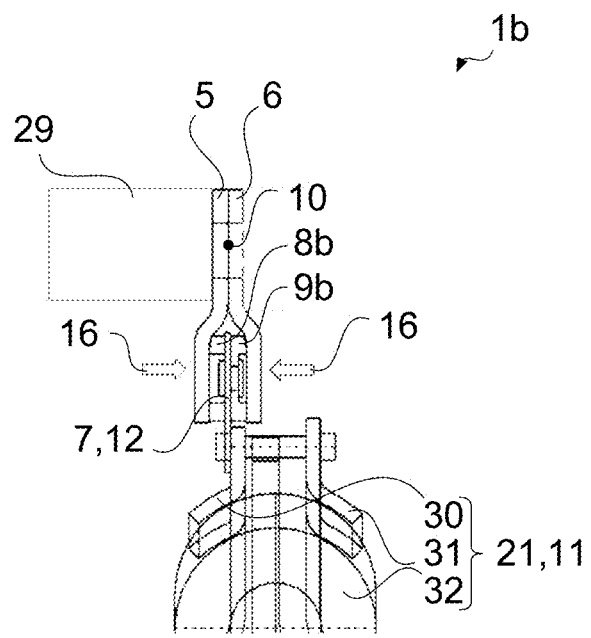
FIG. 3 shows a sectional view of a torque limiter with friction linings riveted to the central disc.

FIG. 3 shows a torque limiter 1b similar to torque limiter 1 of FIG. 1, with the friction linings 8b, 9b riveted to the central disc 7.

Figure 4:
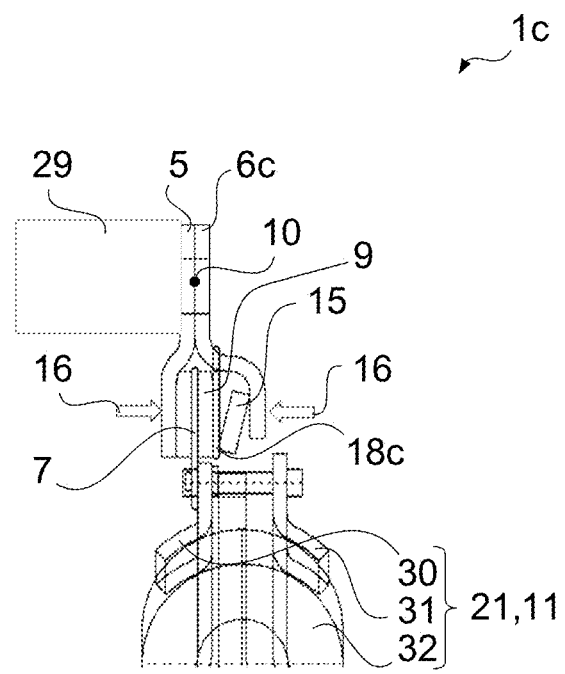
FIG. 4 shows a sectional view of a torque limiter with a central disc, support disc and disc spring.

FIG. 4 of a torque limiter 1c similar to torque limiter 1 of FIG. 1, in which a disc spring 15 is provided. The disc spring 15 is arranged between the (optional rear) cover disc 6c and a (corresponding rear) support disc 18c. The (rear) support disc 18c is arranged between the rear friction lining 9 and the disc spring 15. Here, it is not excluded that the central disc 7 includes an integrated spring element (not shown) and/or the support disc 18 includes a (rear) spring element (not shown). In one embodiment, at least one additional support disc and/or spring element is provided.

Figure 5:
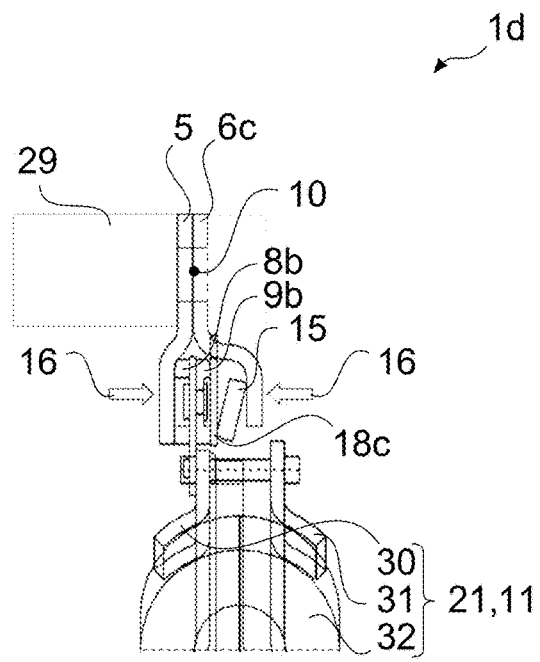
FIG. 5 shows a sectional view of a torque limiter with friction linings riveted to the central disc, support disc and disc spring.

In FIG. 5, a torque limiter 1d is shown in a combination with the embodiments according to FIG. 3 and FIG. 4.

Figure 6:
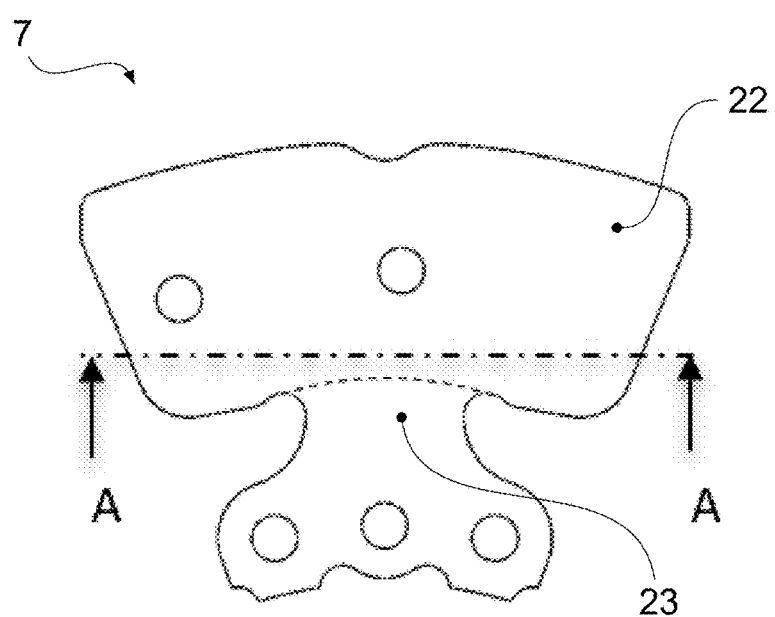
FIG. 6 shows a single segment of a central disc.

In FIG. 6, a single segment of a central disc 7 is shown in an (axial) plan view. The segment is formed here as a single-piece and includes a portion having a radially outer segment 22 and a portion having a radially inner segment 23. In use in a torque limiter 1, 1a, 1b, 1c, 1d (cf. FIG. 1 to FIG. 5), the radially outer segment 22 is arranged to overlap radially with the friction linings 8, 8a, 8b, 9, 9a, 9b, for example the friction linings are riveted to the radially outer segment 22. In use in such a torque limiter 1, the radially inner segment 23 is connected, e.g., indirectly, for example by means of a torsional vibration damper 21, to the radially inner connector 11, for example by means of riveting. The complete central disc 7 includes a plurality of such or similar segments 22, 23, which are spaced apart from one another in the direction of rotation 3 (cf. the embodiment according to FIG. 7) and thus form a (multi-piece) ring. Shown here is a section line A A, showing how the sectional view of the radially outer segment 22 according to FIG. 8 is oriented.

Figure 7:
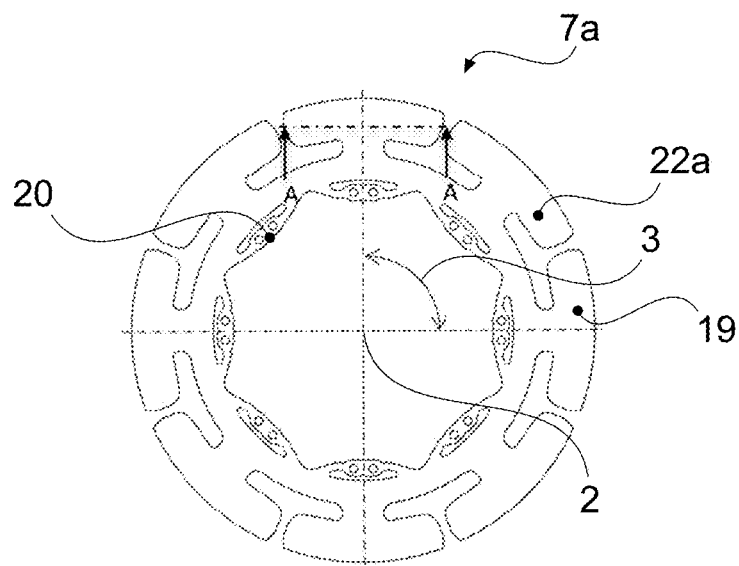
FIG. 7 shows a central disc in the form of a ring.

In FIG. 7, the central disc 7a is shown as a single-piece ring, e.g., with an integrated spring element 12. Central disc 7a may replace central disc 7 in any of torque limiters 1, 1a, 1b, 1c, 1d, for example. The central disc 7a has a rotational axis 2 with a direction of rotation 3. An outer ring portion 19a is located in the radially outer region of the central disc 7a, which includes a plurality of radially outer segments 22a, similar to radially outer segments 22 in FIG. 6. An inner ring portion 20 is formed in the radially inner region, which corresponds to the radially inner segment 23 according to FIG. 6, but also ensures the single-piece nature of the central disc 7a. The inner ring portion 20 ensures the connection to the radially inner connector 11, for example to one of the side plates 30, 31. Here, optionally, the region of attachment, for example by riveting, of the inner ring portion 20 is set apart from the rest of the inner ring portion 20, so that this region of attachment is (almost) exempt from corrugation (for example also of the rest of the inner ring portion 20) and/or deformation of the central disc 7a.

Figure 8:
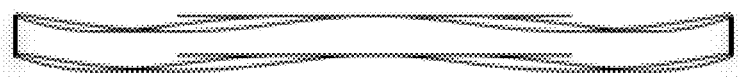
FIG. 8 shows a central disc in a sectional view A-A.

As in FIG. 6, a section line A A is shown, showing how the sectional view of the radially outer segment 22a according to FIG. 8 is oriented.

In FIG. 8, a radially outer segment 22 of a central disc 7, or a radially outer segment 22a of a central disc 7a, is shown in a sectional view along section line A-A (cf. FIG. 6 or FIG. 7). The radially outer segment 22 is (optionally) designed here to be corrugated, thus forming the spring element or part of the integrated spring element 12, 12a, 12b. By means of the corrugated shape, the desired contact force 16 (cf. FIG. 1 to FIG. 5) or a desired spring characteristic is provided and/or the desired contact force 16 is transmitted uniformly.

Figure 9:
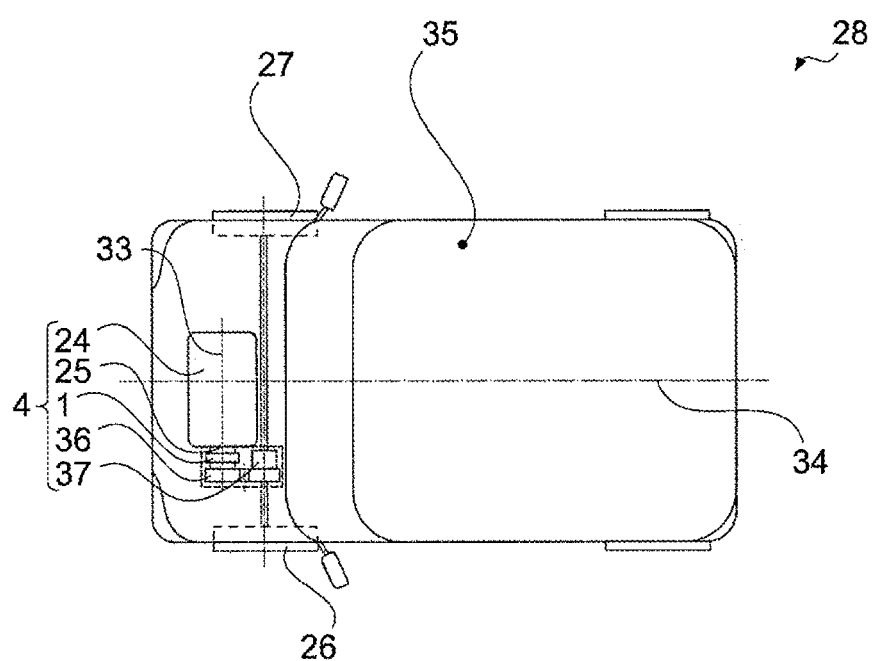
FIG. 9 shows a motor vehicle with a drive train including a torque limiter.

FIG. 9 shows a drive train 4 arranged in a motor vehicle 28 with the motor axis 33 thereof (optionally) transverse to the longitudinal axis 34 (optionally) in front of the driver's cab 35. Here, the torque limiter 1 is connected on the input side to the machine shaft 25 of the drive engine 24, to the transmission gearing 36 and then to the differential 37. From this drive engine 24 or via its machine shaft 25, torque is delivered to the drive train 4. On the output side, the torque limiter 1 is connected to a purely schematically illustrated output, so that here a left drive wheel 26 (consumer) and a right drive wheel 27 (consumer) can be supplied with torque from the drive engine 24 with a variable transmission ratio. The drive engine 24 is protected from a torque peak, for example originating from the consumers 26, 27, by means of the torque limiter 1.

In the case of the torque limiter which is proposed here, a consistent coefficient of friction over a long service life can be achieved.

REFERENCE NUMERALS 1, 1a, 1b, 1c, 1d Torque limiter
2 Rotational axis
3 Direction of rotation
4 Drive train
5 Front cover disc
6, 6a, 6c Rear cover disc
7, 7a Central disc
8, 8a, 8b Front friction lining
9, 9a, 9b Rear friction lining
10 Radially outer connector
11 Radially inner connector
12 Integrated spring element
13 Front spring element
14 Rear spring element
15 Disc spring
16 Contact force
17 Front support disc
18, 18c Rear support disc
19 Outer ring portion
20 Inner ring portion
21 Torsional vibration damper
22, 22a Radially outer segment
23 Radially inner segment
24 Drive engine
25 Machine shaft
26 Left drive wheel
27 Right drive wheel
28 Motor vehicle
29 Flywheel
30 Front side plate
31 Rear side plate
32 Damper spring
33 Motor axis
34 Longitudinal axis
35 Driver's cab
36 Transmission gearing
37 Differential

The invention claimed is:

1. A torque limiter for a drive train, comprising:
a rotational axis;
a first cover disc and a second cover disc;
a central disc arranged axially between the first cover disc and the second cover disc;

a first friction lining arranged axially between the first cover disc and the central disc for frictionally locking torque transmission between the first cover disc and the central disc;

a second friction lining arranged axially between the second cover disc and the central disc for frictionally locking torque transmission between the second cover disc and the central disc;

a radially outer connector permanently connected to the first cover disc and the second cover disc in a torque-transmitting manner; and a radially inner connector permanently connected to the central disc in a torque-transmitting manner, wherein the central ring is a single-piece ring comprising;

an outer ring portion comprising multiple separate radially outer segments spaced apart from one another in radial overlap with the first friction lining and the second friction lining in a rotation direction, the radially outer segments forming a spring element arranged between the first friction lining or and the second friction lining; and multiple separate radially inner segments spaced apart from one another in the rotation direction and connected directly to a torsional vibration damper.

2. The torque limiter of claim 1 further comprising a disc spring, separate from the spring element, arranged axially between:

the first cover disc and the first friction lining; or
the second cover disc and the second friction lining.

3. The torque limiter of claim 1, wherein:

the first friction lining is connected in a force-fitting or form-fitting, as well as torque-transmitting, manner to the first cover disc or the central disc;

the second friction lining is connected in a force-fitting or form-fitting, as well as torque-transmitting, manner to the second cover disc or the central disc; or the first friction lining or the second friction lining is fixed rotationally in a purely frictionally locking manner.

4. The torque limiter of claim 1, further comprising a support disc arranged between:

the first friction lining and the central disc;
the first friction lining and the first cover disc;
the second friction lining and the central disc; or
the second friction lining and the second cover disc.

5. A drive train comprising:

a drive engine having a machine shaft;
a consumer; and
the torque limiter of claim 1, wherein the machine shaft is connected in a predeterminedly limited torque-transmitting manner to the consumer for torque transmission by means of the torque limiter.

6. A motor vehicle comprising a drive wheel drivable by the drive train of claim 5.

* * * * *